United States Patent
Anderson et al.

(10) Patent No.: US 6,632,136 B2
(45) Date of Patent: Oct. 14, 2003

(54) REMOTE ADJUSTMENT MECHANISM FOR A COMBINE HARVESTER CLEANING ELEMENT

(75) Inventors: Mark David Anderson, Battendorf, IA (US); Jon Leo Burns, Davenport, IA (US); Martin Kenneth Bush, Geneseo, IL (US); Heather Irene Chervenka, Bettendorf, IA (US); Jeff Arthur Nelson, East Moline, IL (US); Jack Richard Seyller, Moline, IL (US); Duane Herbert Ziegler, Colona, IL (US)

(73) Assignee: Deere & Company, Moline, IL (US)

( * ) Notice: Subject to any disclaimer, the term of this patent is extended or adjusted under 35 U.S.C. 154(b) by 54 days.

(21) Appl. No.: 09/874,540

(22) Filed: Jun. 5, 2001

(65) Prior Publication Data

US 2002/0183103 A1 Dec. 5, 2002

(51) Int. Cl.[7] ................................ A01F 12/32
(52) U.S. Cl. ..................... 460/101; 460/72; 460/5; 460/109
(58) Field of Search ................ 460/101, 102, 460/72, 109, 5, 119, 120

(56) References Cited

U.S. PATENT DOCUMENTS

| | | | | |
|---|---|---|---|---|
| 2,253,296 A | | 8/1941 | Holtzman | 209/394 |
| 3,472,378 A | | 10/1969 | Payne | 209/394 |
| 4,259,829 A | * | 4/1981 | Strubbe | 460/5 |
| 4,466,231 A | | 8/1984 | Rowland-Hill et al. | 460/2 |
| 4,502,493 A | | 3/1985 | Jones et al. | 460/101 |
| 4,712,568 A | | 12/1987 | Strong et al. | 460/69 |
| 4,770,190 A | | 9/1988 | Barnett | 460/102 |
| 4,897,072 A | | 1/1990 | Bestland | 460/99 |
| 5,338,257 A | * | 8/1994 | Underwood | 460/8 |
| 5,489,029 A | | 2/1996 | Jonckheere et al. | 209/676 |
| 5,525,108 A | * | 6/1996 | Rouse et al. | 460/101 |
| 5,586,033 A | | 12/1996 | Hall | |
| 5,624,315 A | | 4/1997 | Jonckheere | 460/99 |
| 5,795,223 A | | 8/1998 | Spiesberger et al. | 460/102 |
| 5,984,777 A | * | 11/1999 | Kuchar | 460/101 |
| 6,117,006 A | * | 9/2000 | Hofer | 460/101 |

FOREIGN PATENT DOCUMENTS

| | | | |
|---|---|---|---|
| DE | 71 45 564 | 1/1973 | |
| EP | 0 104 676 | 4/1984 | |
| EP | 622860 | * 11/1995 | ........... A01F/12/44 |
| EP | 0 682 860 A1 | 11/1995 | |
| EP | 1 068 792 | 1/2001 | |
| EP | 1068793 | 1/2001 | |
| EP | 1 166 617 A1 | 1/2002 | |

* cited by examiner

Primary Examiner—Árpád Fábián Kovács

(57) ABSTRACT

A remote adjustment mechanism for the louvered cleaning elements of a combine harvester has a linearly movable output member directly fastened to the adjusting bar of each element. The actuator is driven by an electric motor. Calibration and feedback of the louver opening is provided by a pair of non-contact sensors sealed in the actuator housing. A first sensor sends a signal to a microprocessor controller when the output member is in a home position corresponding to a known louver opening. The second sensor sends a signal to the microprocessor that is responsive to movement of the output member. By tracking the movement of the output member from the home position, the current position of the output member is known from which the louver opening is determined based on the louver geometry.

11 Claims, 3 Drawing Sheets

REMOTE ADJUSTMENT MECHANISM FOR A COMBINE HARVESTER CLEANING ELEMENT

FIELD OF THE INVENTION

The present invention is directed to a remote adjustment mechanism for a louvered cleaning element of a combine harvester and in particular to an adjustment mechanism using two sensors for providing feedback to the operator of the louver position and for calibrating the adjustment mechanism.

BACKGROUND OF THE INVENTION

Typically in a combine harvester, after threshing and separation, some chaff and straw are still mixed with the grain. The cleaning unit removes this trash from the grain. In most combines, the cleaning unit comprises three major components: a cleaning fan, a chaffer and a sieve. The cleaning fan has its own housing, whereas the chaffer and sieve are mounted to the cleaning shoe.

The cleaning fan is a multi-bladed fan located in front of the cleaning shoe. The air blast from the fan removes most of the chaff and straw from the grain by blowing the chaff and straw out the rear of the combine. The air blast can be regulated by adjusting fan speed or by changing the fan opening. The grain falls through the chaffer and sieve to a clean grain auger and is carried to the grain tank.

The cleaning shoe, which contains the chaffer and sieve, is mounted to the supporting structure of the combine, below the separating assembly. The bottom of the cleaning shoe contains the tailings auger and the clean grain auger.

The chaffer and sieve are suspended on hangers attached to the sides of the combine. There are three types of typical shoe action, reciprocating, shaking and cascading. In the reciprocating shoe, the chaffer and sieve move in opposite directions to one another. In the shaking shoe the chaffer and the sieve move in the same direction. In the cascading shoe the chaffer and sieve are arranged so that the material drops from one unit to another in a cascading or rolling motion.

Chaffers and sieves are either adjustable or non-adjustable. An adjustable chaffer or sieve is made up of one or more elements of transversely extending louvers with rows of teeth. Each of these louvers is mounted on a crankshaft having a crank arm that engages an axially extending adjusting bar. By axially moving the adjusting bar, all of the louvers are moved simultaneously to change the gap between adjacent louvers between fully opened and fully closed positions. Each element is typically adjusted separately though one actuator may be coupled to the adjusting bars of two or more elements.

The adjustable chaffer and sieve are adjusted in response to crop conditions. The louvers of the chaffer are opened or closed just enough so that the grain falls through the chaffer before passing the length of the chaffer. If the chaffer is opened too wide, it may overload the sieve with chaff. If the chaffer is not opened wide enough, grain will be lost out the rear of the combine. If the sieve is not opened wide enough, excess grain will be directed to the tailings auger. The louvers of the sieve must be opened far enough to allow kernels of grain to fall through easily, but not so far that straw and chaff are allowed to drop through. A combine harvester may be equipped with a pre-cleaner before the chaffer that includes yet another louvered cleaning element. As used herein, the term "cleaning element" refers to any adjustable louvered element, whether in a pre-cleaner, chaffer or sieve.

With many combines, an operator must reach into the back of the combine between the sidesheets to adjust each element. This makes adjustment cumbersome and time consuming. Various remote adjustment mechanisms have been proposed. U.S. Pat. No. 4,897,072 discloses a cable drive mechanism that enables an operator to adjust the louver angle from the operator's station. U.S. Pat. No. 5,586,033 discloses a device that adjusts the louver by a motor driven cable mechanism for automatic control. The motor is mounted to the combine frame. Other adjustment mechanisms use actuators mounted to the chaffer or sieve frame. These may be driven electrically. Each element may have its own actuator or a single actuator may be coupled to the adjusting bars of multiple elements within the chaffer and sieve.

A problem with using a cable drive to remotely adjust the cleaning element is the hysteresis due to cable windup and free play in the adjustment linkage joints. One solution for this hysteresis is to attach the actuator directly to the frame of the chaffer or sieve. The difficulty with attachment of the actuator to the frame is the vibration and shock loading of the actuator as the chaffer and sieve moves relative to the combine, in addition to free play in the linkage between the actuator and the adjusting bar. Another area of concern is proper feed back of the position of the louvers to the operator.

SUMMARY OF THE INVENTION

The present invention provides a compact actuator for each cleaning element of the combine harvester. The actuator has a linearly movable output member directly fastened to the adjusting bar of each element. The output member moves the adjusting bar to cause the opening of the louvers to be adjusted. The actuator includes an electrically driven motor to move the output member. Two non-contact sensors are used to determine the position of the output member. The motor and sensors are sealed within an actuator housing to protect these elements from dirt in the environment. A first sensor sends a signal to a microprocessor controller when the output member is in a home position. The home position of the output member corresponds to a known spacing of the louvers in the element. A second sensor sends a signal to the microprocessor that is responsive to movement of the output member. By tracking the movement of the output member from the home position, the current position of the output member is known, from which the opening of the louvers is determined based on the known geometry of the louvers.

An operator input device at a remote location includes switches, or other input mechanisms, to be used by the operator to activate the actuator. Multiple input devices can be used. An input device located in the operator's cab allows the operator to make adjustments while harvesting. Another input device located on the side of the machine allows adjustments to be made to clean the elements or to make small adjustments when the machine is not harvesting.

Using non-contact sensors, preferably Hall effect sensors, improves the durability of the position feedback. With the output member directly coupled to the adjusting bar, backlash and hysteresis are largely eliminated from the system, enabling accurate feedback of the louver position to the operator without directly sensing the louver position with sensors in the crop and/or debris flow path.

DESCRIPTION OF THE PREFERRED EMBODIMENT

Figure 1:
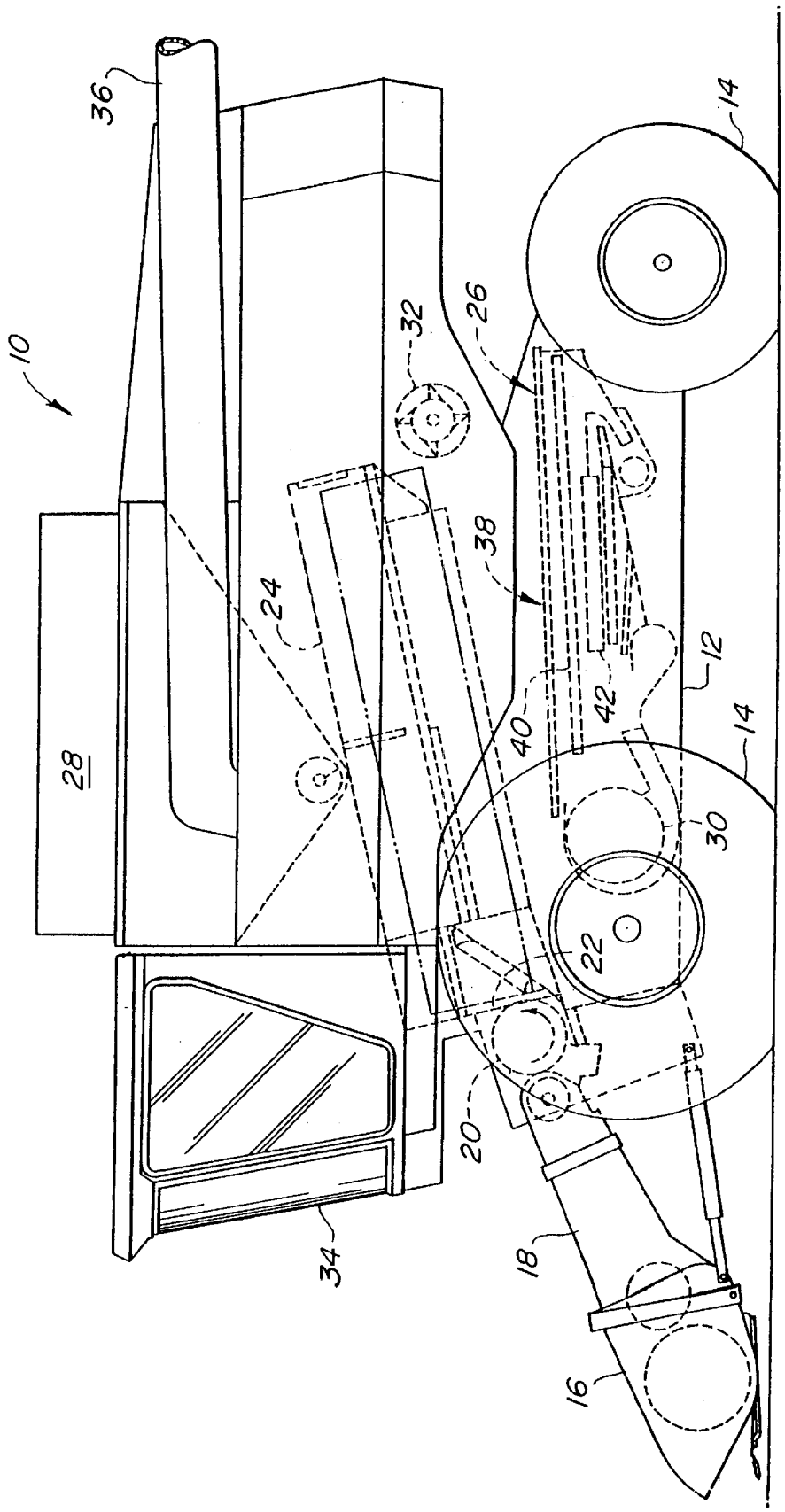
FIG. 1 is a side elevational view of a combine harvester showing the threshing, separating and cleaning assemblies.

FIG. 1 is the side view of a self-propelled agricultural combine harvester 10. The combine comprises a supporting structure 12 having wheels 14. The supporting structure comprises two axially extending sidesheets between which are located the various processing assemblies. A harvesting platform 16 is at the front of the combine and directs a harvested crop to a feederhouse 18. The feederhouse is a conveyor for directing the harvested crop material to the threshing, separating and cleaning assemblies located within the sidesheets of the combine. Although the present invention is disclosed as being included in a combine with a longitudinal separator, it may also be used on cylinder/walker combine as well as any other combine configurations having a louvered cleaning element.

In the illustrated combine, the feederhouse 18 directs the harvested crop to a transverse beater 20 that propels the crop material through an inlet transition section 22 to a rotary threshing and separating assembly 24. Grain and chaff are directed from the axial threshing and separating assembly 24 to a cleaning assembly 26. The cleaning assembly in turn directs the clean grain to grain tank 28 and the chaff is blown out the rear of the combine by cleaning fan 30. Crop material other than grain and chaff is directed by the axial separating unit to a transverse beater 32 that propels this material out the rear of the combine. Clean grain temporarily stored in grain tank 28 can be unloaded by actuation of unloading auger 36 by an operator in operator's cab 34. The threshing and separating assembly and the cleaning assembly are located between the sidesheets of the supporting structure. The cleaning assembly includes a cleaning shoe 38, which in turn includes a chaffer 40 and a sieve 42.

Figure 2:
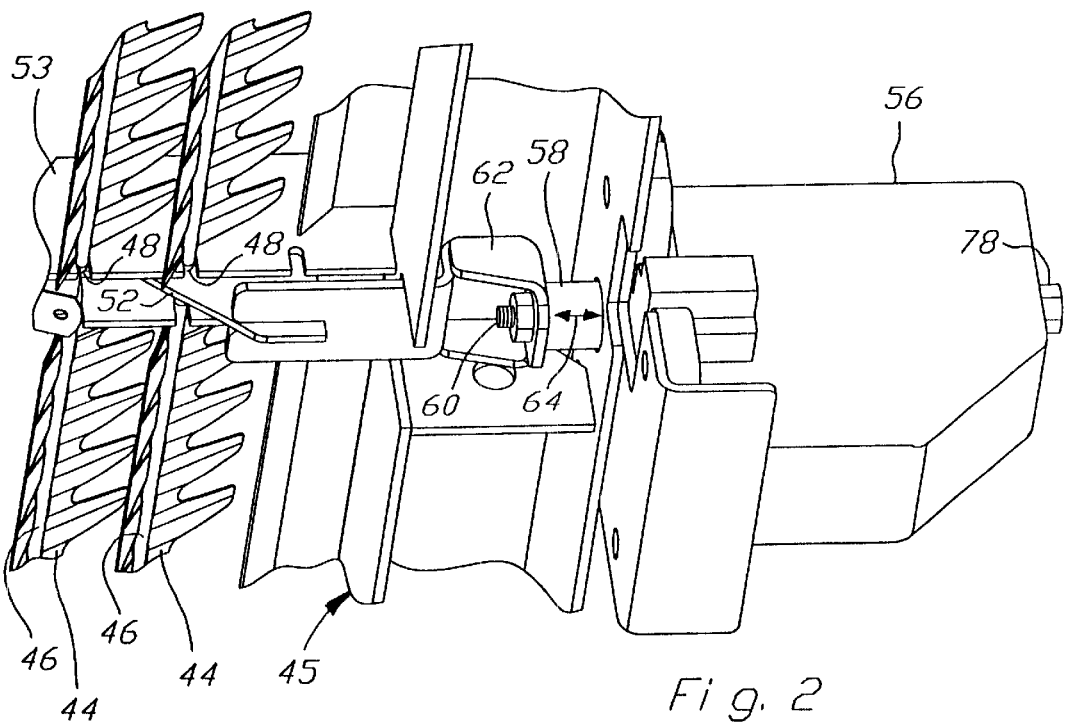
FIG. 2 is a bottom perspective view of a portion of a cleaning element with the actuator of the present invention.
Figure 3:
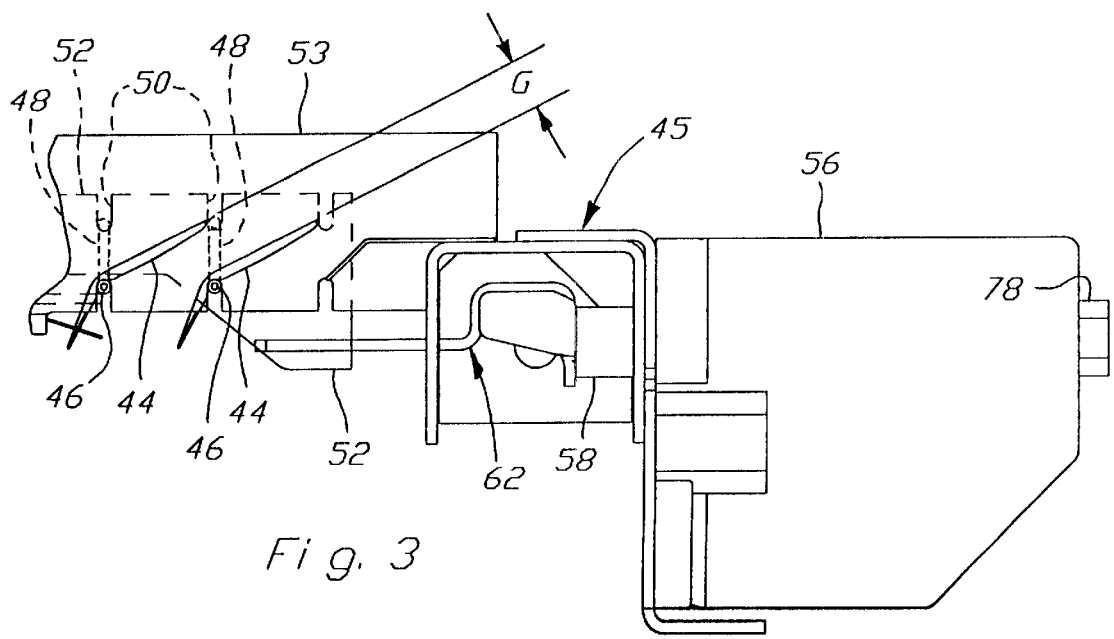
FIG. 3 is a side view of the portion of the cleaning element shown in FIG. 2.

The chaffer and sieve are provided with one or more elements each having transversely extending adjustable louvers 44, shown in FIGS. 2 and 3. The present invention is directed to an actuator for adjusting the louvers in the cleaning elements. The louvers 44 are mounted in a frame 45 carried by the cleaning shoe. With reference to FIG. 3, each of the louvers is provided with a crankshaft 46 bent to form a crank arm 48. Each crank arm is positioned in a slot 50 of an axial adjusting bar 52. By moving the adjusting bar 52 longitudinally, or lengthwise of the adjusting bar, the angular orientation of all the louvers in the element can be adjusted. This changes the gap "G" between adjacent louvers. The gap "G" can be adjusted to selected positions between a fully opened position and a fully closed position. The adjusting bar 52 is housed in an axially extending inverted U-shaped housing 53.

The adjustment mechanism includes an actuator 56 mounted to the frame 45 and having a linearly or lengthwise movable output member 58. The output member 58 has a threaded stud 60, which is fastened to a bracket 62 by a nut. The bracket 62 is rigidly coupled to the adjusting bar 52. As the output member 58 moves, as shown by the arrow 64, the adjusting bar 52 also moves, causing the crank shafts 46 to rotate to change the angular position of the louvers 44. Rotation of the louvers changes the gap "G" between adjacent louvers 44.

Figure 4:
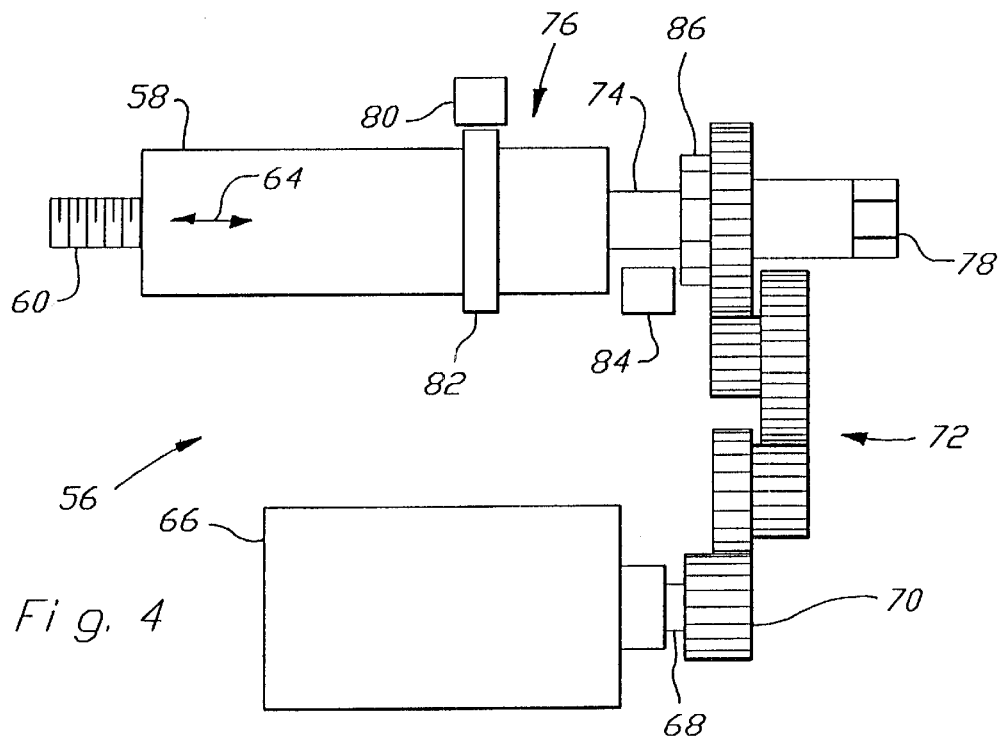
FIG. 4 is a side view of the internal components of the actuator.

The internal components of the actuator 56 are shown in greater detail in reference to FIG. 4 where the housing of the actuator is not shown. The actuator includes a powered motor 66 having a rotary output shaft 68 driving a gear 70. In the preferred embodiment shown, the motor is an electric motor. Other types of motors may be used such as hydraulic, pneumatic, etc. A speed reduction gear train 72 couples the motor output to the rotary input shaft 74 of a linear actuator 76. As the input shaft 74 rotates, internal screw threads in the linear actuator 76 cause the output member 58, which is fixed against rotation in the actuator 56 housing, to move linearly or lengthwise as shown by the arrow 64. The shaft 74 is formed with a hex, square, or similar fitting 78 that extends from the actuator housing as shown in FIGS. 2 and 3. The fitting 78 can be used to drive the shaft 74 by a wrench if needed in the event of a failure of the electric drive system or damage to the actuator gear train 72.

Figure 5:
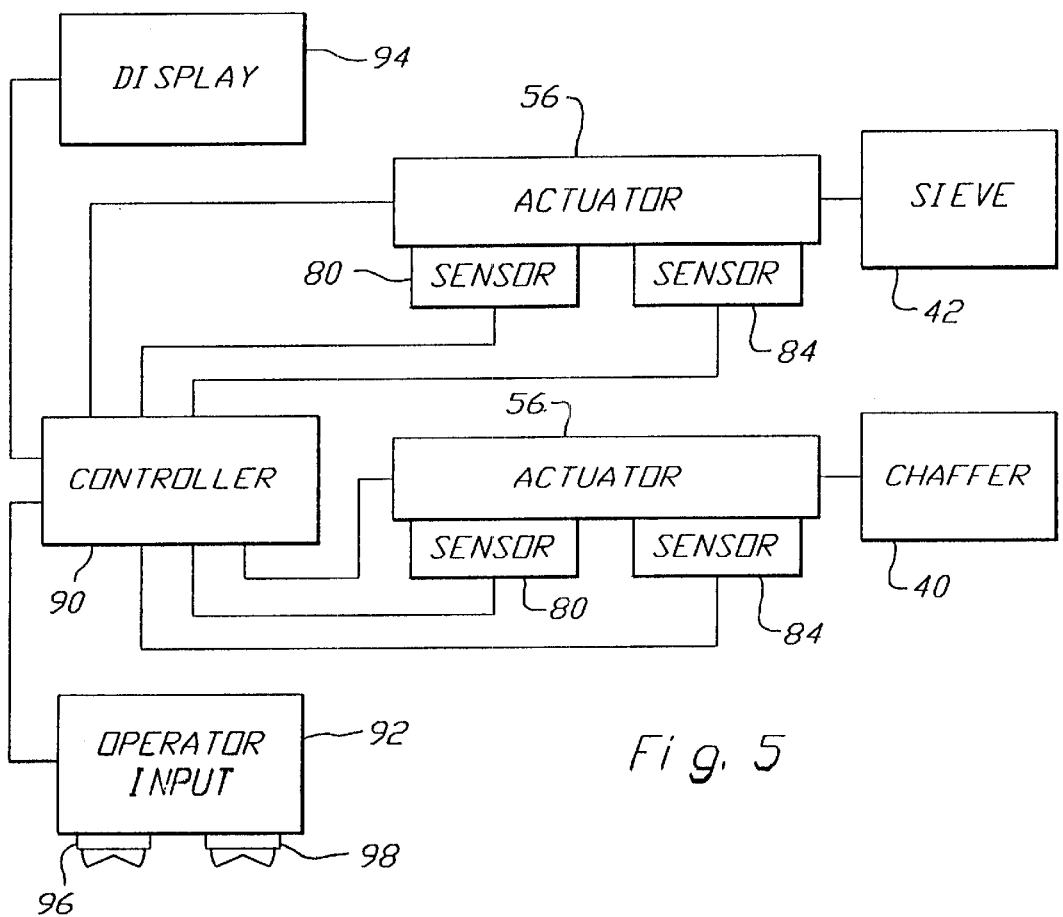
FIG. 5 is a block diagram of the control system.

The control system for the adjustment mechanism is shown schematically in FIG. 5. Two actuators 56 are shown, one for the louver element of the chaffer 40 and another for the cleaning element sieve 42. If the chaffer and sieve have more than one element, an actuator 56 is provided for each element. The control system operates via a CAN based controller network to allow the operator to make adjustments on the fly from the cab 34. A microprocessor controller 90 is at the heart of the control system and receives input from each of the sensors 80 and 84. A further input to the controller 90 is from the operator input device 92 located in the cab 34, remote from the actuator 56. The combine operator uses the input device 92 to make adjustments to the louver position. A second input device (not shown) can be provided on the side of the machine for making adjustments when the machine is not harvesting.

The controller outputs include signals to the actuators 56 to operate the respective electric motors 56 to open or close the louvers. In addition, a display 94 displays to the operator a number, etc, that corresponds to the size of the gap "G". The chaffer and sieve cleaning elements are each independently adjustable with a separate switch on the operator input device 92. If either the chaffer or sieve have multiple elements, the control system can be designed to adjust the elements separately or together.

The control system further includes a first sensor 80 positioned along the length of the output member 58. A magnet 82 activates the sensor 80 to generate a signal when the output member 58 is in a "home" position. In the home position, the gap "G" between adjacent louvers is known. The gap "G" at the home position is measured at the factory and stored in the control system memory. A second sensor 84 is positioned adjacent a magnet ring 86 on the input shaft 74 of the linear actuator 76. The sensor 84 generates a signal as each pole of the magnet ring 86 passes the sensor 84. With each signal generated from the sensor 84, the output member 58 has moved a known linear distance that corresponds to a known angular rotation of the crankshafts 46 effecting the gap "G" between adjacent louvers. As the output member 58 moves from the home position in either direction, the extent of movement is known by the output signal from the second sensor 84. Both sensors 80 and 84 are preferably non-contact type sensors, such as Hall effect sensors. This improves the durability of the sensors and the overall function of the control system.

The motor 66 is controlled with a pulse-width-modulated command signal. The motor 66 can be modulated to slow speed when making small adjustments to the louver position or to a fast speed when making large adjustments or when completely opening the louvers for cleaning of the elements.

The operator input device 92 is shown with a pair of switches 96 and 98, one switch for each of the chaffer and sieve. Other switch arrangements can be used. Two-speed operation can be accomplished in various ways. Multiple switches on the input device can be used with one set of switches for slow speed, fine adjustment and the other set used for fast adjustment. Alternatively, a fast/slow speed selector switch can be used with one set of switches for the cleaning elements. Two-speed operation may be programmed into the controller 90 using various schemes. For example, fast speed operation can be activated after the adjustment switch has been depressed for a given length of time. Another scheme allows the operator to make adjustments at a slow speed and when the actuator is used in a combine with an automatic combine adjustment option, a fast speed is used to change the settings between preset positions for different crops (corn, soybeans, wheat, etc.) and also to a wide open cleaning position.

The actuator 56 drives the element directly without any gears or linkages between the output member 58 and the louvers 44. This reduces system backlash and hysteresis. Furthermore, the element louvers open or close immediately with the actuation of the motor 66. The louver opening position-sensing system is highly accurate in both directions. The Hall effect sensors have no contacting parts so that they can survive the shaking environment of the cleaning shoe elements. The first sensor is calibrated to a known louver opening at the factory and then can be used to track the accuracy of the feedback signal over time. This system can recalibrate to this known "home" position either automatically or as commanded by the operator through the operator input device 92.

While the actuator of the present invention has been described in the context of the cleaning elements of a chaffer and a sieve, the actuator can be used with a louvered cleaning element of a pre-cleaner as well.

Having described the preferred embodiment, it will become apparent that various modifications can be made without departing from the scope of the invention as defined in the accompanying claims.

What is claimed is:

1. A combine harvester cleaning element and remote adjustment mechanism comprising:
    a plurality of adjustable louvers carried by a frame;
    an adjusting bar arranged normal to the louvers and being movable in a lengthwise direction of the adjusting bar;
    a powered actuator having a linearly movable output member fixed to the adjusting bar for moving the adjusting bar and holding the adjusting bar in a selected position whereby the louvers are set in a selected position between a fully opened position and a fully closed position;
    a control system for the actuator including a first sensor that generates an output signal when the output member is in a home position that corresponds to a known position of the louvers and a second sensor that generates a signal corresponding to the movement of the output member whereby the opening of the louvers can be determined by the extent of movement of the output member from the home position.

2. The apparatus as defined by claim 1 further comprising an operator input device remote from the actuator to operate the actuator to open or close the louvers and a visual display for indicating to an operator the louver opening.

3. The apparatus as defined by claim 2 wherein the operator input device provides input for changing the louver position at one of two different speeds.

4. The apparatus as defined by claim 1 wherein a controller program of the control system provides for changing the louver position at one of two different speeds.

5. The apparatus as defined by claim 1 wherein the linearly movable output member moves linearly in the lengthwise direction of the adjusting bar.

6. The apparatus as defined by claim 1 wherein the sensors are non-contact sensors.

7. The apparatus as defined by claim 1 wherein the sensors are Hall effect sensors.

8. The apparatus as defined by claim 1 wherein the actuator includes an electric drive motor to move the output member linearly.

9. The cleaning elements as defined by claim 1 further comprising a microprocessor controller receiving inputs from the sensors and the operator input device and sending output signals to the actuator to move the louvers and to the display to indicate the louver position.

10. The apparatus as defined by claim 1 further comprising manual means for moving the output member.

11. A method of calibrating an adjustment mechanism of a combine harvester cleaning element having a plurality of adjustable louvers carried by a frame, an adjusting bar arranged normal to the louvers and movable in a lengthwise direction of the adjusting bar, a powered actuator mounted to the frame and having a linearly movable output member fixed to the adjusting bar for moving the adjusting bar and holding the adjusting bar in a selected position whereby the louvers are set in a selected position between a fully opened position and a fully closed position, a control system including a first sensor that generates an output signal when the output member is in a home position that corresponds to a known position of the louvers and a second sensor that generates a signal corresponding to the movement of the output member, and a microprocessor receiving inputs from the sensors and sending outputs to the actuators, the calibration method comprising the steps of:
    moving the output member to the home position;
    subsequently moving the output member and measuring the movement of the output member by the signal generated by the second sensor;
    determining the position of the louvers based on the movement of the output member from the home position; and
    displaying the determined louver position.

* * * * *